J. B. STEARNS.
Repeaters for Duplex Telegraphs.
No. 134,776. Patented Jan. 14, 1873.
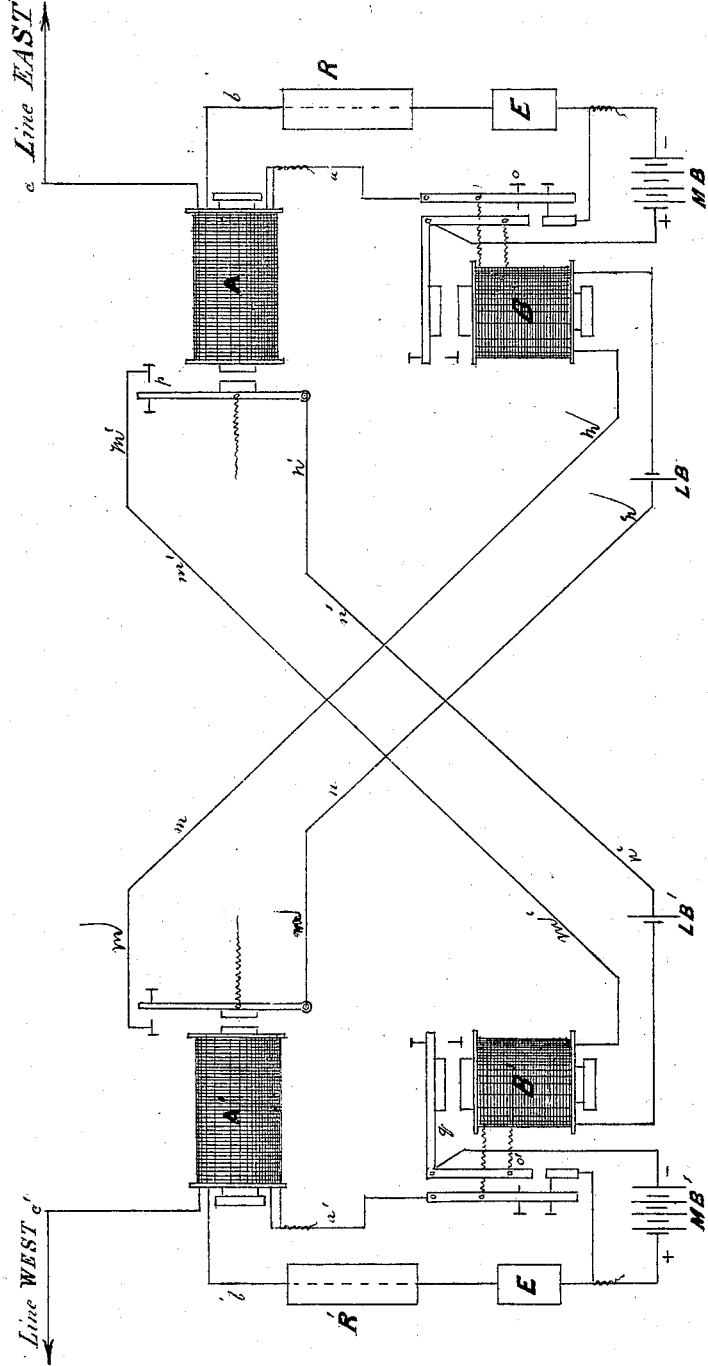

UNITED STATES PATENT OFFICE.

JOSEPH B. STEARNS, OF BOSTON, MASSACHUSETTS.

IMPROVEMENT IN REPEATERS FOR DUPLEX TELEGRAPHS.

Specification forming part of Letters Patent No. 134,776, dated January 14, 1873.

*To all whom it may concern:*

Be it known that I, JOSEPH B. STEARNS, of Boston, in the county of Suffolk and Commonwealth of Massachusetts, have invented an Improvement in Telegraph Apparatus, of which the following is a specification:

In telegraphing on long lines between two stations at such a distance apart that a current of sufficient intensity to enable them to be worked direct cannot be maintained, it is common to make use of an apparatus at an intermediate station, which receives the signals sent from one station and automatically retransmits them to the other station with additional battery force.

This apparatus is known as a repeater or translator; and my invention consists in an improved form, which repeats simultaneously to each station signals arriving from opposite stations on the same line-wire at the same time.

I have previously patented—June 2, 1868, Letters Patent Nos. 78,547 and 78,548—apparatus for telegraphing in opposite directions on the same line-wire at the same time; and in my present invention I make use of this apparatus, so connecting two of them together at one station that they form a repeater.

The construction and operation of my double transmitting apparatus are fully described in the patents before referred to; but for the purpose of more fully explaining my present invention I will state briefly that the principle of its operation consists in preventing the relay at the sending station, though always in circuit, from responding to the signals transmitted from that station by winding its electro-magnet with two coils in opposite directions, or by constructing said relay of magnets opposed to each other, and by dividing the current from the battery into two branches, one of which passes through one coil or one magnet of the relay to the line, and the other passes through the other coil or other magnet to the earth, through a resistance-coil having the same or nearly the same resistance as the line. When, therefore, the circuit is closed at the sending-station these divided currents neutralize each other's effect upon the relay, and it remains silent.

My repeating apparatus is arranged as follows: A is the receiving-magnet or relay of the line "east," and A' the receiving-magnet or relay of the line "west." B is an electro-magnet on the eastern side of the repeater, and which is in circuit of local battery L B, and whose armature-lever acts as a key to close the circuit from the main battery M B through the receiving-magnet A. The circuit of L B is broken and closed by the lever of the western receiving-magnet A', and B' is an electro-magnet on the western side of the repeater excited by the local battery L B', and similarly arranged as the magnet B with the receiving-magnet A of the line east. M B $o$ $a$ A $c$ is the eastern circuit; and M B $o$ $a$ A $b$ R E, the neutralizing branch circuit of the receiving instrument; M' B' $o'$ $a'$ A' $c'$ the western circuit; and M' B' $o'$ $a'$ A' $b'$ R' E', the neutralizing circuit of its relay; and $m'$ $n'$, the western local circuit.

The operation of this repeater is as follows: When a signal is transmitted from the eastern station the eastern receiving-magnet A is excited, the armature-lever falls against the contact $p$, and the local circuit $m'$ $n'$ is closed through the western local magnet B', its lever $q$ falls against the contact $o'$, the circuit of the main battery M' B' is closed, and the signal retransmitted to the western station. Though the circuit is closed through the magnet A' it, however, fails to respond, owing to the division of the circuit, as before explained, and the neutralizing effect of the branch circuit A' R' E'; consequently its lever remains unmoved. Should, however, a signal be transmitted from the western station at the same time the balance between the neutralizing currents circulating in the relay or receiving instrument A' is disturbed by this increase of current strength in one wire of magnet A', and the armature-lever is moved, thereby completing the local circuit $m$ $n$, exciting the magnet B, and thereby transmitting the signal to the eastern station by the main battery M B. The two distant stations are thus enabled to communicate with each other simultaneously, both signals being repeated at the same time at the intermediate station.

Any of the forms of double transmitting relays described in the above-mentioned patents, Nos. 78,547 and 78,548, may be substituted for the relays A and A'.

What I claim as my invention, and desire to secure by Letters Patent of the United States, is—

The arrangement, in a duplex repeater, of the electro-magnets A A' B B', and their corresponding circuits, as and for the purpose set forth.

JOSEPH B. STEARNS.

Witnesses:
  WILLIAM A. HAYES, Jr.,
  C. E. CRANE.